US008074169B2

(12) United States Patent
Balinsky

(10) Patent No.: US 8,074,169 B2
(45) Date of Patent: Dec. 6, 2011

(54) DOCUMENT CREATION SYSTEM AND RELATED METHODS

(75) Inventor: Helen Balinsky, Wales (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1084 days.

(21) Appl. No.: 11/190,249

(22) Filed: Jul. 27, 2005

(65) Prior Publication Data

US 2006/0026504 A1 Feb. 2, 2006

(30) Foreign Application Priority Data

Jul. 27, 2004 (GB) .................................. 0416638.5
Jan. 31, 2005 (GB) .................................. 0501886.6

(51) Int. Cl.
*G06F 17/00* (2006.01)
*G06F 17/20* (2006.01)
*G06F 17/21* (2006.01)
*G06F 17/22* (2006.01)
*G06F 17/24* (2006.01)
*G06F 17/25* (2006.01)
*G06F 17/26* (2006.01)
*G06F 17/27* (2006.01)
*G06F 17/28* (2006.01)

(52) U.S. Cl. .......................... 715/247; 715/243; 715/253
(58) Field of Classification Search .................. 715/521, 715/513–517, 520; 382/180
See application file for complete search history.

(56) References Cited

U.S. PATENT DOCUMENTS 5,214,755 A * 5/1993 Mason .......................... 715/520
5,956,738 A 9/1999 Shirakawa
6,380,954 B1 4/2002 Gunther
6,415,306 B2 7/2002 Seaman
6,825,945 B1 * 11/2004 Silverbrook et al. ......... 358/1.15
6,826,727 B1 * 11/2004 Mohr et al. .................... 715/517
2004/0205472 A1 * 10/2004 Purvis ............................ 715/500
2006/0212801 A1 * 9/2006 Berker et al. .................. 715/513
2006/0259860 A1 * 11/2006 Kobashi ........................ 715/521

FOREIGN PATENT DOCUMENTS

| EP | 1503336 A2 | 2/2005 |
| GB | 2378340 A | 2/2003 |
| GB | 2 416 614 A | 2/2006 |
| WO | WO 98/10356 | 3/1998 |
| WO | 01/39019 A2 | 5/2001 |
| WO | WO 01/39019 A2 | 5/2001 |
| WO | WO 02/37939 A2 | 5/2002 |
| WO | WO 02/084582 A2 | 10/2002 |

OTHER PUBLICATIONS

European Examination Report dated Oct. 11, 2007 in copending application No. GB0515355.6, 3 pages.
GB Examination Report mailed Nov. 24, 2009 (3 pages).

* cited by examiner

*Primary Examiner* — Chat Do
*Assistant Examiner* — Stephen Alvesteffer

(57) ABSTRACT

A method of creating a document comprises obtaining a plurality of content-elements that it is desired to print on the document; considering one or more perimeters into which the obtained content-elements are to be placed; attempting to arrange the or each considered perimeter on the document; adjusting the dimensions of one or more perimeters such that the perimeters can be placed on the document; re-arranging the content-elements within a perimeter according to pre-determined rules as the dimensions are adjusted; and generating the document created by the method.

20 Claims, 10 Drawing Sheets

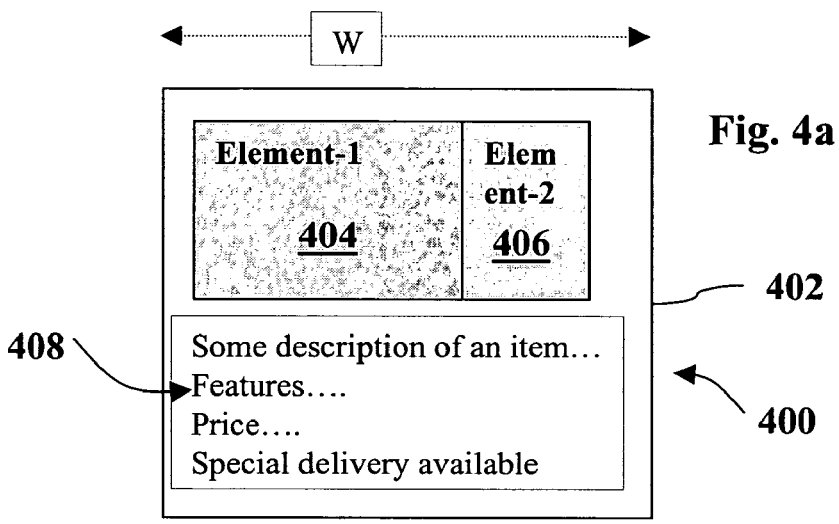
Fig. 4a
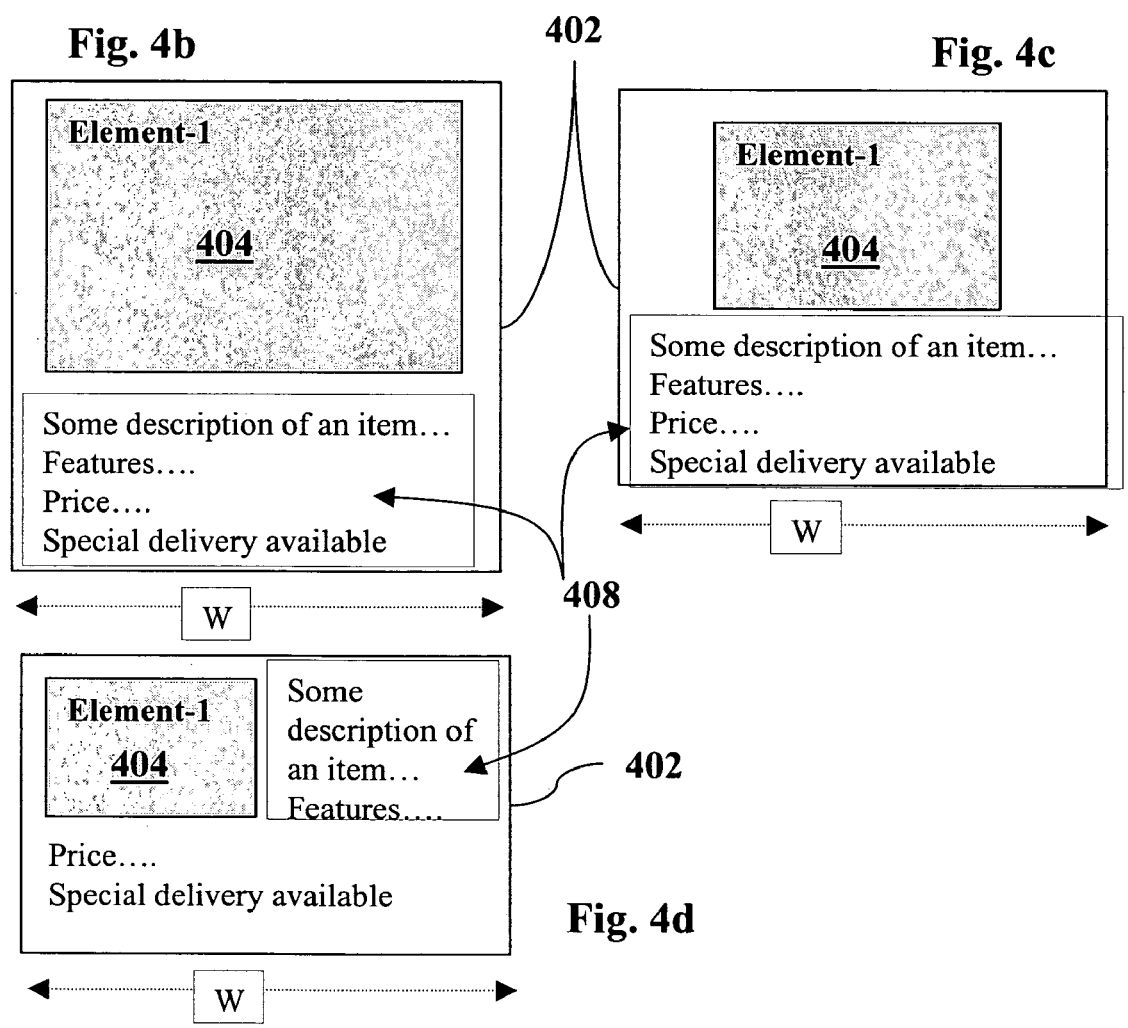
Fig. 4b
Fig. 4c
Fig. 4d

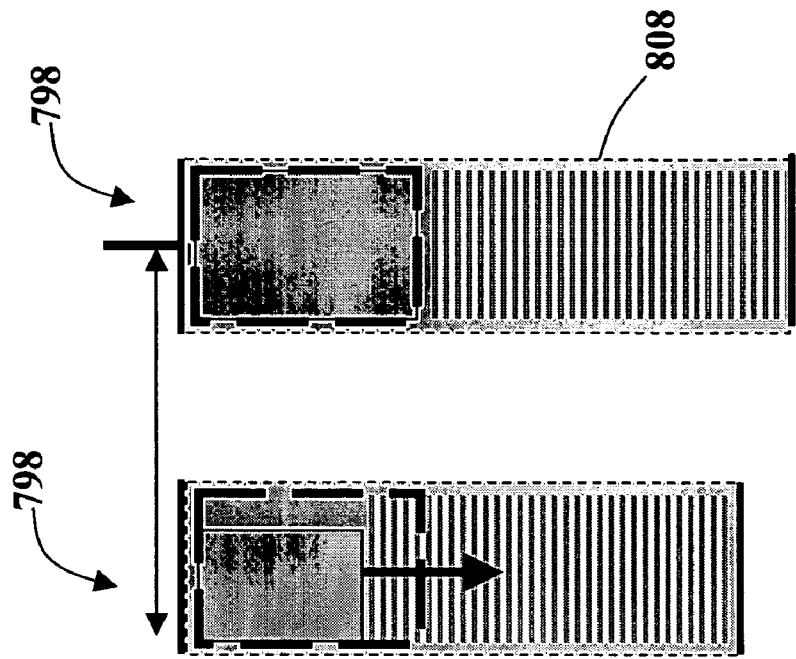
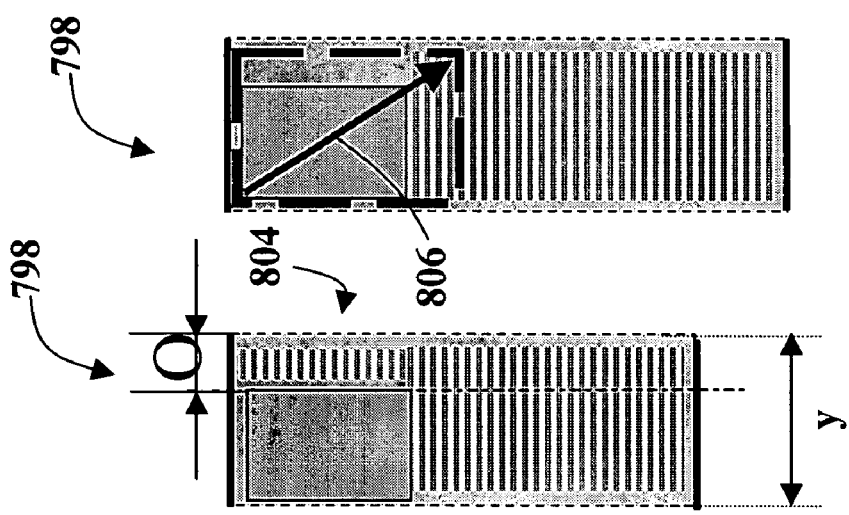
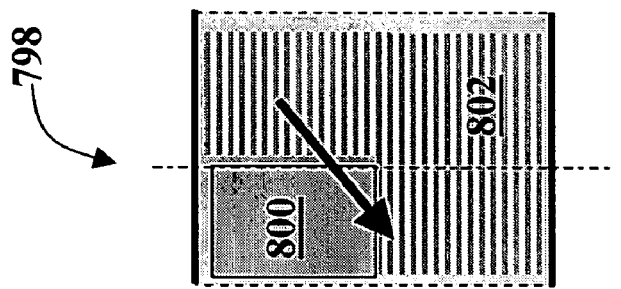
Fig. 7e  Fig. 7d  Fig. 7c  Fig. 7b  Fig. 7a

DOCUMENT CREATION SYSTEM AND RELATED METHODS

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE TO A JOINT RESEARCH AGREEMENT

Not applicable.

INCORPORATION-BY-REFERENCE OF MATERIAL SUBMITTED ON A COMPACT DISC

Not applicable.

TECHNICAL FIELD

This invention relates to a document creation system and related methods. In particular, but not exclusively, the invention relates to the customisation of printed documents.

BACKGROUND

It will be appreciated that a personalised item of sales literature, for example a brochure or an advertising flyer, is likely to result in more sales per literature item than an item of sales literature that is sent en masse to many customers. An item of sales literature that is produced for the general public will undoubtedly include information that is not of interest to all customers that receive the literature and each customer will have to look through the literature to find the parts that are of interest to them. Personalising an item of sales literature can include selecting specific content-elements for a specific customer, and placing these in certain areas of a brochure or flyer in an aesthetically pleasing way. Thus, ideally each customer would receive a unique edition of the sales literature.

With the advent of databases holding information about customers', clients', etc. (hereinafter referred to as customer) preferences, purchases, past actions, and the like, it has become possible to generate targeted communications that are targeted specifically to a particular customer based upon the data held in the database. Such databases may be exemplified by so-called supermarket loyalty schemes. However, the skilled person will appreciate that such schemes are only one such example.

It will be appreciated that such databases may comprise many thousands (and even tens, hundreds of thousands or more) of customers. It would be impossible to check, manually, that targeted communications sent to such a number of people conform to accepted presentation rules within reasonable time scales. As such the process should be advantageously performed automatically.

Elements for the communication may be graphical or textual in nature and different elements may have logical connections with each other or even be part of one another. For example, a furniture suite and a settee from the same suite may be sold separately. Thus, the suite and the settee may be considered separate but may need to be placed logically together. The elements for inclusion in any one catalogue are therefore highly variable which increases the difficulty in laying out the communication.

Further, elements for inclusion in the communication may vary from one item to the next. For example, a picture may be provided for each of the settee and the suite. It is likely that the size of the picture, its aspect ratio and the like will vary. Thus elements may not necessarily be switched with one another without the need to re-work the layout for the communication. Thus, prior art solutions such as hard templates are problematic in that they cannot generally handle elements which vary from one to another.

For example, in each edition of the communication, images for consideration at any one point may have significantly different aspect ratios, scalability ranges, and/or may be missing. Similarly, descriptions may significantly vary in length and also be missing. Hard template technology cannot tolerate such variability: missing data or data that is too small will result in unsightly empty holes in a layout, whilst oversized data will unavoidably create unauthorized overlaps between different fields and items. Neither of these is acceptable for professionally laid out communications. Moreover, items layout by hard templates will always result in a layout of the same dimensions—this will not provide required flexibility for creating highly customized communications on fly; i.e. editions of the same communication targeted to each intended customer.

Known systems for automatically packing content-elements into an allocated area aim to minimize the total area taken up by the content-elements. This approach is not relevant for publishing where aesthetic appeal is a priority, and a number of design rules should be considered. Variable, or smart templates, are also know and provide an extension of hard templates; see for example U.S. application U.S. Ser. No. 10/738,178 filed Dec. 16, 2003.

Other known systems for packing content-elements into an allocated area select content-elements that are to be placed next to each other using random searches based on analogies to other processes, for example simulated annealing. Such searches tend to be in infinite domains and thus may not result in acceptable solutions within a reasonable time scale.

SUMMARY

According to a first aspect of the invention there is provided a method of creating a document comprising:
  a. obtaining a plurality of content-elements that it is desired to print on the document;
  b. considering one or more perimeters into which the obtained content-elements are to be placed;
  c. attempting to arrange the or each considered perimeter on the document;
  d. adjusting the dimensions of one or more perimeters such that the perimeters can be placed on the document;
  e. re-arranging the content-elements within a perimeter according to pre-determined rules as the dimensions are adjusted;
  f. generating the document created by the method.

According to a second aspect of the invention there is provided a document creation system comprising a supply of content-elements that it is desired to place on a document; a perimeter creation means arranged to consider one or more perimeters each suitable for containing a plurality of content-elements; an arrangement means arranged to access the supply of content-elements, obtain a plurality of such content-elements for each of the perimeters created by the perimeter creation means and arrange them within the perimeter; and an adjustment means arranged to adjust the dimensions of at least one perimeter in order to create the document and to re-arrange the content-elements within the adjusted perimeter according to pre-determined rules.

According to a third aspect of the invention there is provided a program for creating a document comprising:
   a. instructions to cause a plurality of content-elements that it is desired to print on the document to be obtained;
   b. instructions to cause a consideration of one or more perimeters into which the obtained content-elements are to be placed;
   c. instructions that cause the consideration of arrangements of one or more perimeters on the document;
   d. instructions that cause the adjustment of the dimensions of one or more perimeters such that the perimeters can be placed on the document;
   e. instructions that re-arrange the content-elements within a perimeter according to pre-determined rules as the dimensions are adjusted;
   f. instructions that generate the document created by the method.

According to fourth aspect of the invention there is provided a machine readable medium containing instructions which when read by a machine cause that machine to perform the method of the first aspect of the invention.

According to a fifth aspect of the invention there is provided a machine readable medium containing instructions which when read by a machine cause that machine to function as the system of the second aspect of the invention.

According to a sixth aspect of the invention there is provided a machine readable medium containing instructions which provide the program of the third aspect of the invention.

The machine readable medium of any of the above aspects of the invention may be any one or more of the following: a floppy disk; a CDROM/RAM; a DVD ROM/RAM (including +R/RW, −R/RW); any form of magneto optical disk; a hard drive; a memory; a transmitted signal (including an internet download, file transfer, or the like); a wire; or any other form of medium.

According to a further aspect of the invention there is provided a method of placing a number of known elements (which may correspond to content-elements) in a bounding box (which may correspond to a perimeter) comprises associating at least one rule with each potential known element to be placed in a bounding box, said rule being used to account for empty space appearing as a result of a missing element.

BRIEF DESCRIPTION OF THE DRAWINGS

There now follows by way of example only a detailed description of the present invention with reference to the accompanying drawings in which:

FIG. 4 shows how a page layout may be modified should a content-element for display thereon become unavailable;

FIG. 7 shows further examples of how content-elements may be moved and/or re-sized;

DETAILED DESCRIPTION

This particular invention may be used to automatically lay out communications, which are generally, but not exclusively, printed documents having a displayable area. For conciseness this method will hereinafter be described in relation to the creation of printed documents although it has wider applicability. The method may for example be applied to creation of electronic documents such as emails, web pages, ADOBE™ PDF files and the like. Generally, the documents will be stored in an electronic form in an electronic memory.

The production of a document is a time consuming task which is made more time consuming if the document is to be customised to a specified reader. The document may for example be a holiday brochure, a store magazine, a catalogue, or the like, in which the contents is tailored according to the reader to whom the document will be sent or otherwise addressed.

Figure 1:
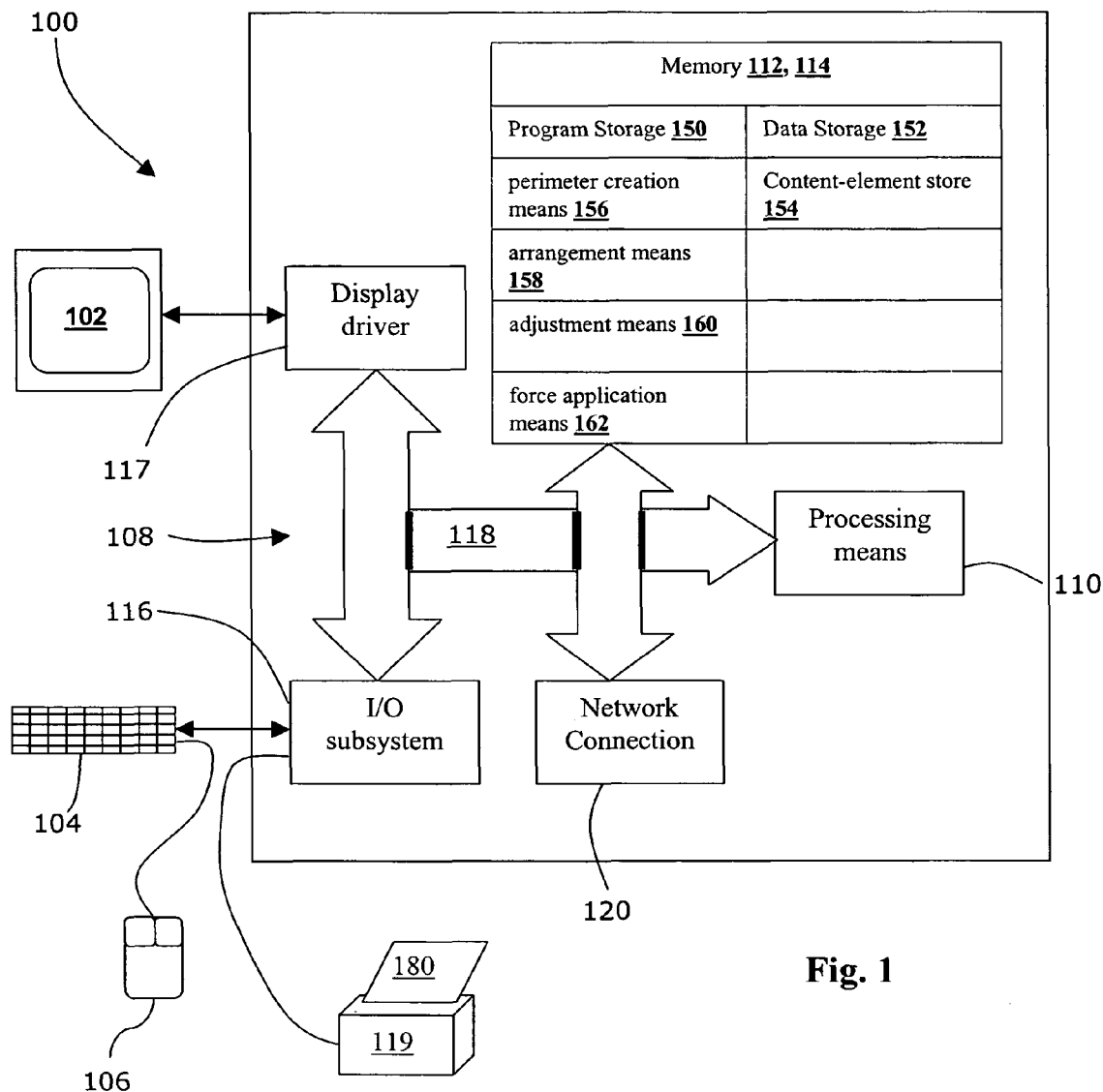
FIG. 1 schematically shows a computer programmed to provide an embodiment of the present invention.

FIG. 1 shows a computer 100 arranged to accept data and to process that data. The computer 100 comprises a display means 102, in this case an LCD (Liquid Crystal Display) monitor, a keyboard 104, a mouse 106 and processing circuitry 108. It will be appreciated that other display means such as LEP (Light Emitting Polymer), CRT (Cathode Ray Tube) displays, projectors, televisions and the like may be equally possible.

The processing circuitry 108 comprises a processing means 110, a hard drive 112, memory 114 (RAM and ROM), an I/O subsystem 116 and a display driver 117 which all communicate with one another, as is known in the art, via a system bus 118. The processing means 110 (often referred to as a processor) typically comprises at least one INTEL™ PENTIUM™ series processor, (although it is of course possible for other processors to be used) and performs calculations on data. The other processors may include processors such as the AMD™ ATHLON™, POWERPC™, DIGITAL™ ALPHA™, and the like.

The hard drive 112 is used as mass storage for programs and other data and may be used as a virtual memory. Use of the memory 114 is described in greater detail below.

The keyboard 104 and the mouse 106 provide input means to the processing means 110. Other devices such as CDROMS, DVD ROMS, scanners, etc. could be coupled to the system bus 118 and allow for storage of data, communication with other computers over a network, etc.

The I/O (Input/Output) subsystem 116 is arranged to receive inputs from the keyboard 104, mouse 106, printer 119 and from the processing means 110 and may allow communication from other external and/or internal devices. The display driver 117 allows the processing means 110 to display information on the display 102.

The processing circuitry 108 further comprises a transmitting/receiving means 120, which is arranged to allow the processing circuitry 108 to communicate with a network. The transmitting/receiving means 120 also communicates with the processing circuitry 108 via the bus 118.

The processing circuitry 108 could have the architecture known as a PC, originally based on the IBM™ specification, but could equally have other architectures. The processing circuitry 108 may be an APPLE™, or may be a RISC system, and may run a variety of operating systems (perhaps HP-UX, LINUX, UNIX, MICROSOFT™ NT, AIX™, or the like). The processing circuitry 108 may also be provided by devices such as Personal Digital Assistants (PDA's), mainframes, telephones, televisions, watches or the like.

The computer 100 also comprises a printer 119 which may be thought of as a printing means which connects to the I/O subsystem 116. The printer 119 provides a printing means and is arranged to print documents 180 therefrom.

It will be appreciated that although reference is made to a memory 114 it is possible that the memory could be provided by a variety of devices. For example, the memory may be provided by a cache memory, a RAM memory, a local mass storage device such as the hard disk 112 (i.e. with the hard drive providing a virtual memory), any of these connected to the processing circuitry 108 over a network connection such as via the transmitting/receiving means 120. However, the processing means 110 can access the memory via the system bus 118, accessing program code to instruct it what steps to perform and also to access the data. The processing means 110 then processes the data as outlined by the program code.

The memory 114 is used to hold instructions that are being executed, such as program code, etc., and contains a program storage portion 150 allocated to program storage. The program storage portion 150 is used to hold program code that can be used to cause the processing means 110 to perform predetermined actions. Although expanded upon hereinafter the program storage portion 150 in particular provides a perimeter creation means 156, an arrangement means 158, an adjustment means 160 and a force application means 162.

The memory 114 also comprises a data storage portion 152 allocated to holding data and in embodiments of the present invention in particular provides a content element store 154 arranged to hold a supply of content-elements.

Embodiments of the present invention allow aesthetic rules and user preferences to place highly variable content-elements on a page of a document (which may contain one or more pages). A content-element may comprise any number of parts including any of the following non-exhaustive list: a title, an image, a description, a price, etc. and as such may be either graphical or textual in nature. It is useful to introduce the concept of an item which comprises a set of content-elements. Each of the content-elements within an item will generally relate to a sale unit; i.e. an item or services that may be purchased. Often a sale unit has a unique code in a shop catalogue. Thus, a settee and an arm chair which can be purchased together or separately may provide three sale unit combinations and three items: the chair on its own, the settee on its own and the combination of the settee and the chair.

Figure 2:
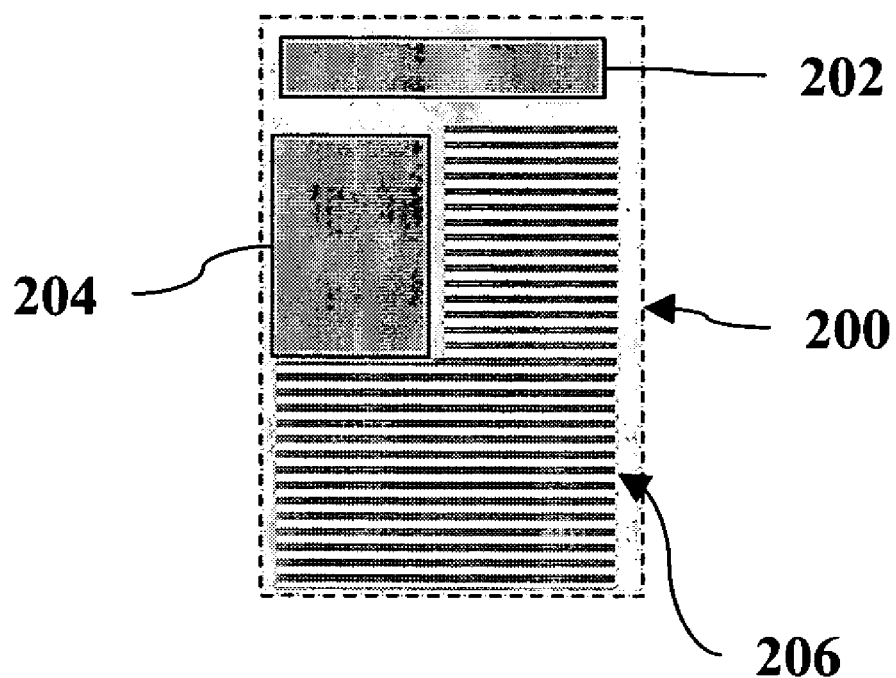
FIG. 2 shows an example of an item which comprises a set of content-elements.

For example an item 200 is shown schematically in FIG. 2. The item 200 comprises the following content elements: a title 202, a picture 204 and a portion of text 206. Continuing the example the item 200 may relate to an object (which may be a sale unit) that is to be placed in a catalogue (which will constitute the document). As such the title 202 and the portion of text 206 will provide written information about the object whilst the picture 204 will provide an image. An item may comprise more or less elements. A typical item may comprise roughly 3 to 8 content-elements. However it will be appreciated that an item may comprise any number of content-elements.

A page of a document that is being created by an embodiment of the present invention may comprise a plurality of items. In the field of catalogues it may be appropriate to have between roughly 3 and 15 items on any one page of the catalogue (i.e. the document). However, in other fields other number of items per page may be appropriate.

Embodiments of the present invention are arranged to process one or more such items and arrange them on a page. The items may be aligned with each other and other boundaries, and also arranged to satisfy other aesthetical rules such as balance, unity, sequence and the like as will be appreciated by designers.

It is convenient to arrange the content-elements 202, 204, 206 that make up an item 200 as being within a perimeter, which in this example is a rectangular (or square) perimeter. The perimeter may be thought of as a bounding box for the item 200. Thus, each item 200 has a perimeter associated therewith which will generally contain a plurality of content-elements. If there is more than one item displayed on a page of a document then each perimeter will occupy less than the area of the page. However, if there were only a single item displayed on the page then the perimeter may occupy the same, or roughly the same, area as the page.

It is convenient to assume that the perimeter has a fixed/imposed dimension (in the case of a square or rectangle this may be either the height or the width). The other characteristic dimensions of the perimeter shape may be varied in order that the content-elements may be arranged within the perimeter of the fixed/imposed dimension. This will be expanded upon hereinafter. However, the person skilled in the area will appreciate that the fixed/imposed dimension may be imposed upon the perimeter by exterior design principles, style requirements, available space and relations to other content-elements, items, etc. on a page (for example to be aligned with other items, images or titles which have already been placed).

Referring to FIG. 3, it will be appreciated that one aesthetic consideration is alignment. It is natural to have items on a page aligned with one another and this can be achieved by extending the boundaries of objects on a page to form what may be termed alignment lines. The lower the number of alignment lines on a page then the lower the Birkhoff visual complexity for that page. The Birkhoff visual complexity is equal to the number of align lines on the page. Generally, a page is considered to become better as its visual complexity decreases which is perhaps especially true for pages having a higher number of content-items thereon.

Figure 3C:
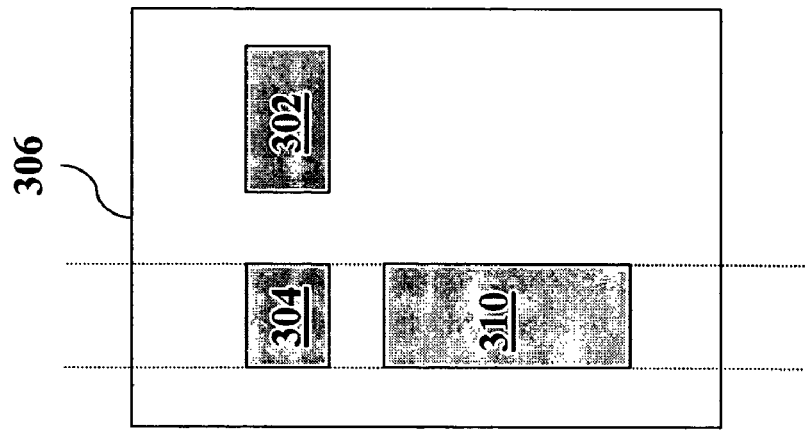
FIG. 3 shows various arrangements of content-elements on a page of a document.
Figure 3B:
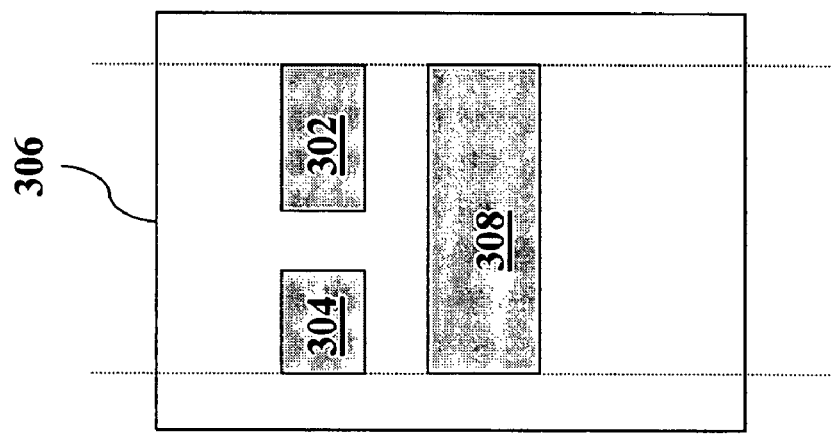
Figure 3A:
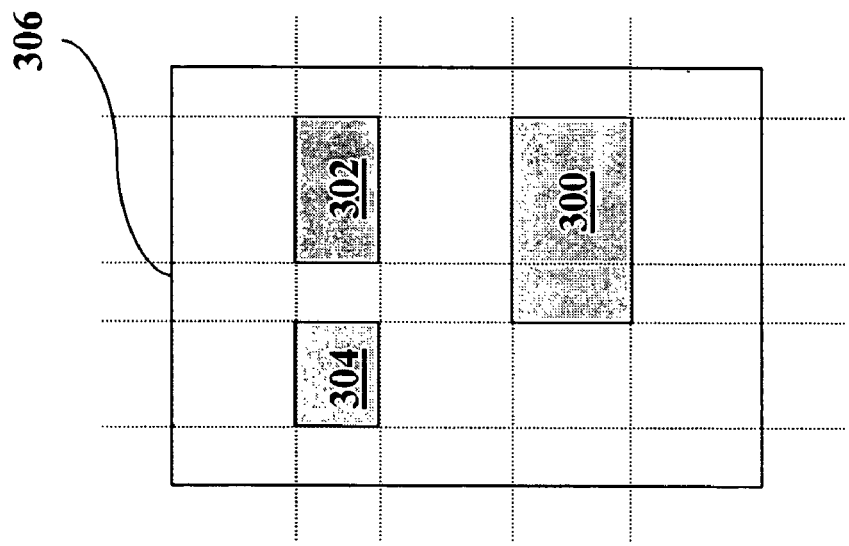

FIG. 3*a* shows three objects 300, 302, 304 arranged on a page 306. The possible alignment lines have been drawn for ease of understanding. It will be seen that the alignment line generated from the object 300 are co-incident with the rightmost alignment line from both objects 302 and 304. If the object 300 was not dimensioned so that this was the case then there would be two further alignment lines in FIG. 3*a*.

In FIG. 3*b* the objects 302 and 304 remain unaltered from FIG. 3*a*. However, object 300 has been re-sized to give object 308; thus the leftmost edge of object 308 is co-incident with the alignment line produced by the leftmost edge of object 304 and the rightmost edge of object 308 is co-incident with the alignment line produced by the rightmost edge of object 302. Further alignment lines have been omitted for clarity. Thus, it will be appreciated that the FIGS. 3*a* and 3*b* are equally possible arrangements when considering the arrangement in terms of alignment but that FIG. 3*b* is visually less complex and may therefore be preferred. It should be noted that the width of object 308 has been increased in relation to the width of object 300 and the height of object 308 has been correspondingly reduced.

As with FIG. 3b, in FIG. 3c the objects 302 and 304 remain unaltered from FIG. 3a. However, object 300 has been re-sized to give object 310; thus the leftmost edge of object 310 is co-incident with the alignment line produced by the leftmost edge of object 304 and the rightmost edge of object 310 is co-incident with the alignment line produced by the rightmost edge of object 304. Further alignment lines have been omitted for clarity. Thus, it will be appreciated that the FIGS. 3a and 3c are also equally possible arrangements when considering the arrangement in terms of alignment but that FIG. 3c is visually less complex and may therefore be preferred. It should be noted that the width of object 310 has been reduced in relation to the width of object 300 and the height of object 310 has been correspondingly increased. It will be further appreciated that further arrangements will be equally possible when considering the arrangement in terms of alignment.

Thus, in the examples being shown in FIG. 3, the width of the objects 300, 308 and 310 are determined by an external factor; the reduction of the number of alignment lines in the arrangement. The height (or other dimension) of each of these objects 300, 308 and 310 is varied as will be explained hereinafter. The objects shown in FIG. 3 may represent the perimeter of an item discussed elsewhere in which case the varying of the dimension will generally be so that content-items within the perimeter can be correctly accommodated.

FIG. 4 shows how this may be applied in a more practical example. FIG. 4a shows an item 400 comprising a perimeter 402 (which may be a virtual line although it is shown as a line in the Figure), two picture content-elements 404, 406 and a text content-element 408 relating to the pictures. The item 400 has a width w which has been imposed by an external influence. When it comes to lay-out the page of the document 180 one of the picture content-elements 406 is not available. It is therefore desirable to re-arrange the remaining content-elements 404, 408 within the perimeter 402. FIGS. 4b to 4d show examples of how the content-elements 404, 408 may be re-arranged. Each of the examples shown in FIGS. 4b to 4d may be equally as good as one another from an aesthetical point of view and therefore the selection may be made according to user preferences, desired style and the like.

FIG. 4b shows an example in which the size of the remaining picture content-element 404 has been expanded and the text content-element 408 has been positioned underneath. It should be noted that, although the size of the picture content-element 404 has been increased, the width of the perimeter 402 remains at w (because it has been imposed by an external influence); the height of the perimeter has been increased.

FIG. 4c shows an example in which the size of the remaining picture content-element 404 has been left unaltered but in which the content-element 404 has been centred and the text content-element 408 has been positioned underneath. Again, it should be noted that the width of the perimeter 402 remains w.

FIG. 4d shows an example in which the size of the remaining picture content-element 404 has been reduced and the text content-element 408 has been wrapped around it. However, it should again be noted that the width of the perimeter 402 remains w.

Embodiments of the invention may be arranged to re-arrange the content-elements within an item according to predetermined rules should a situation, such as exemplified in FIG. 4, occur in which a content-element is unavailable, or in other situations. Further, it will be appreciated that since a dimension of the perimeter is likely to be imposed by an external influence then the content-elements within the item may be need re-arranging once the dimension of the perimeter has been set. Further, and as discussed above, when laying out a page of a document 180 there may be a great degree of variability between items: each item may comprise a different number of picture content-elements; correspondent picture content-elements may be of a different aspect ratio and/or have a different scalability range; correspondent text content-elements may be of a different length and the like. As such an area that may have been appropriate to locate a first item may not be appropriate to locate a second item.

Thus, embodiments of the invention may apply predetermined rules to content-elements within an item. Rules from one embodiment of the invention are discussed with the aid of FIG. 5.

Referring to FIG. 2, the content-elements that may constitute an item 200 comprise what may be termed non-flowing content-elements and flowing content-elements. The title 202 and the picture content-element 204 may be thought of as non-flowing content-elements and the text content-element 206 may be thought of as a flowing content-element. Non-flowing content-elements 202,204 are those that should be placed at a fixed position within the perimeter. Flowing content-elements 206 are those that may be used to fill the remainder of the space inside a perimeter once the non-flowing content-elements have been placed and as such the flowing content-elements have a variable shape. The flowing content-elements may be thought of as dynamic content-elements.

When laying out a document 180 an item may be placed on the page. The content-elements within the item should then be laid out therein. In some embodiments this is performed in a two step process. In the first step the non-flowing content-elements are positioned. Generally in the first step, the content-elements should be laid out such that none of them overlap with one another and it may be a further requirement that there is no un-wanted trapped space between content-elements, between content-elements and a portion of the perimeter, etc.

In the second step the dynamic, or flowing, content-elements are added to the item. One method of performing the second step may be to estimate a first area corresponding to the area of the item not covered by the non-flowing content-elements and a second area corresponding to the area that will be covered by the dynamic content-elements and then adjust the alterable dimension of the perimeter such that the first and second areas match. It will be appreciated that in the embodiment being described one dimension of the perimeter has been imposed by an external influence.

An example of a method for performing the first stage of filling the perimeter is shown in FIG. 5. FIG. 5a shows three content-elements 600, 602, 604 that it is desired to place within a perimeter, a portion 606 of which is shown to the left of the Figure. In FIG. 5a the three content-elements may be satisfactorily arranged.

Figure 5D:
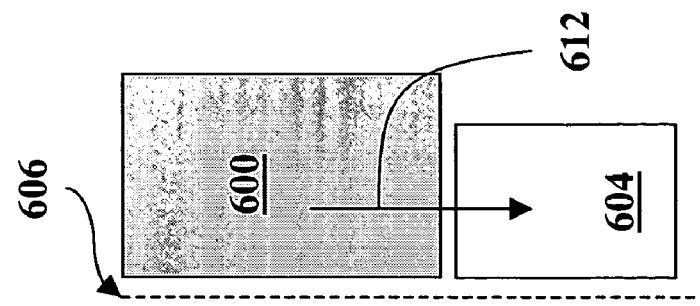
FIG. 5 exemplifies how content-elements may be moved according to an embodiment of the invention should one or more of the content-elements be displaced.
Figure 5C:
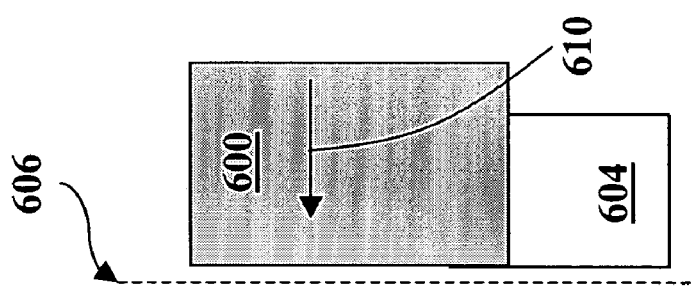
Figure 5B:
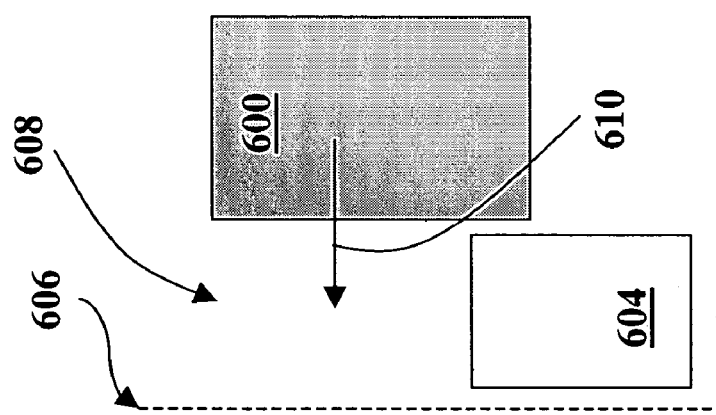
Figure 5A:
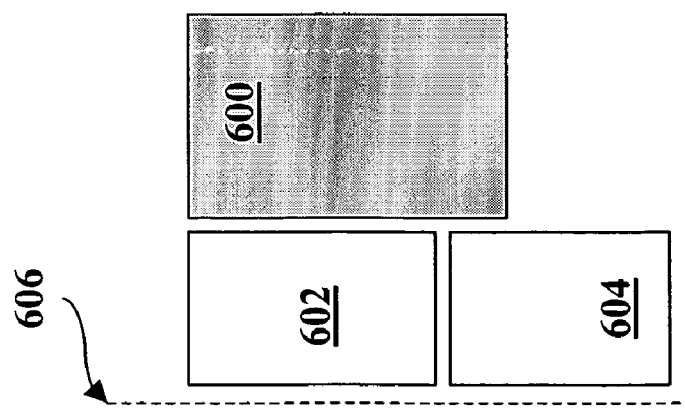

In FIG. 5b the situation is considered in which the content-element 602 is not available. Therefore a gap 608 appears between the content-element 600 and the portion 606 of the perimeter. As discussed above it is generally undesirable to have unwanted trapped space within a document layout such as the gap 608.

In the embodiment of FIG. 5 a conditional rule which applies a notional force 610 is applied to a content-element that forces elements toward a predetermined direction, in this case to the left most wall of the item; i.e. toward the portion 606 of the content-element shown in the Figure. Thus, once the content-element 602 is no longer present there is nothing to stop content-element 600 from moving toward the portion 606 of the perimeter as shown in FIG. 5c.

Thus, the mechanisms described in FIG. 5 may be thought of as providing rules not only as to where to place a content-element but "what to do if" something unexpected, and/or undesirable occurs (e.g. a content-element is missing or an overlap occurs). That is the rules are conditional on the occurrence of an event. The use of the conditional rule which applies a notional force may be thought of as being modelled upon a hydro-mechanical system and may provide a mechanism for determining what should happen to objects connected by a spring, an object being exposed to a buoyancy force, etc.

Referring back to FIG. 5c, an overlap is caused between the content-elements 600 and 602 such overlap is again generally undesirable/unacceptable. In this embodiment a second conditional rule which applies a notional force 612 is applied to a content-element if an overlap occurs which tends to move the content-element in the extendible dimension of the perimeter (i.e. that dimension that is not restrained by an external influence). In the example of FIG. 5d the height of the perimeter may vary (the width being imposed by an external influence) and therefore the second conditional rule applies a notional force 612 is in a vertical direction. Thus, the content-element is moved in a downward direction relative to the Figure. If the direction is not extendible then the non-flowing content-element may be moved to another boundary or may be scaled. Referring to the hydro-mechanical system discussed above the force in FIG. 5d may be thought of as a buoyancy or displacement force.

The rules that are discussed in relation to FIG. 5 may be thought of as relating to moving content-elements to account for empty space appearing as a result of a missing element. In addition to the conditional rules applying the notional forces described un-conditional rules may be used; i.e. rules that are not conditional on the occurrence of an event.

Rules associated with an embodiment of the invention include conditional and unconditional rules. Unconditional rules may be determined relative to any of the following, non-exhaustive list: positions and/or dimensions of elements relative to the perimeter; other content-elements inside a perimeter; axis/alignment lines or similar features. Such unconditional rules are applied unconditionally during layout of a particular item. An example of an unconditional rule that may be used in some embodiments of the invention is for what is deemed to be the most important non-flowing content-element to be placed at the focus point of a page of the document (i.e. in a central region of the page roughly ⅔rd's of the way from the foot of the page to the top of the page).

Conditional rules are those which are applied only if certain condition are true. These rules may be described as "what to do if". For example, if a content-element for a field is missing then perform a certain action.

Although it is discussed that the rules may tend to prevent the overlap of content elements there may be authorised overlaps. For example, a price may be allowed to overlap an image to which it relates.

Should a conditional rule impose a force then the force may have a magnitude associated with it. As such a content-element with a greater buoyancy force may move above a content-element with a lesser buoyancy force in order to avoid an overlap of the elements.

Such conditional rules may include a rule which provides a swapping force, which preferably operates to ensure that a larger one of two adjacent content-elements is moved to be adjacent to an edge of a perimeter. The skilled person will appreciate the aesthetic principle of sequence refers to the arrangement of content-elements in a layout in a way that facilitates the movement of the eye through the information displayed. It has been found that the eye moves from: big to small objects; from bright to subdued colours; and from colours to black and white. Thus a conditional rule may be used to swap content-elements to help ensure that sequence is followed.

Figures 9A, 9B:
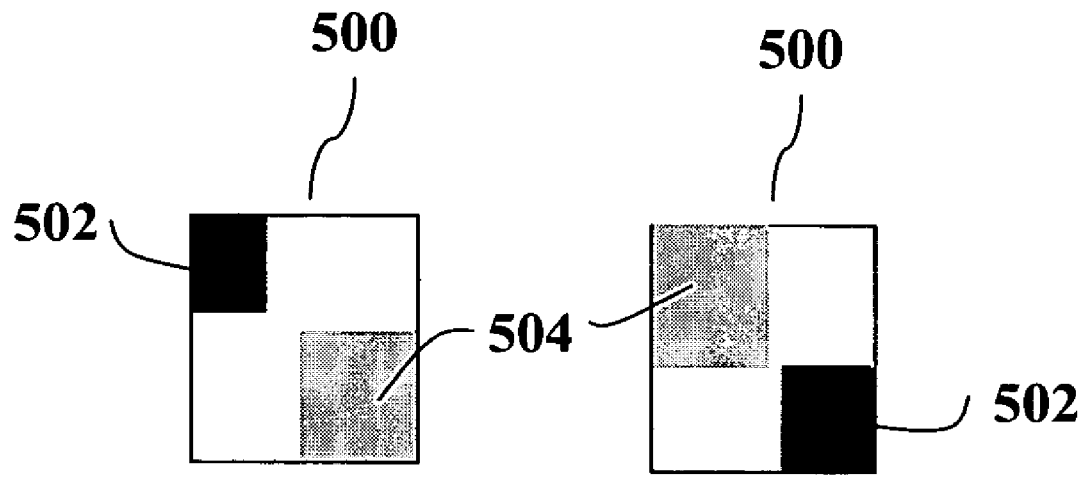
FIG. 9 shows yet a further example of how content-elements may be moved according to an embodiment of the invention.

FIGS. 9a and 9b show an example of such a force in use wherein an item 500 contains two content-elements 502, 504. Although it will be appreciated that there is no correct layout when considering aesthetic principles, there may be a preferred layout. In FIG. 9a the content-element 502 is shown in a left region of the item 500 and the content-element 504 is shown in a right region of the item 500. If the conditional rule applying the swapping force determines that sequence, or other aesthetic principle, may be better followed if the content-elements 502, 504 were switched then the content-elements 502 are switched. FIG. 9b shows the item 500 in which the content-element 502 now appears on the right and the content-element 504 appears on the left.

As discussed above, in the second step of filling the item, the flowing content-elements are added and the scaleable dimension of the perimeter is adjusted if necessary. Once the non-flowing content-elements have been placed in the perimeter the free space within the perimeter (i.e. the first area) is defined by: $A_{free}=A_{perimeter}-A_{non-flowing}$. I.e. the free area (or the area of the perimeter that is not taken up by non-flowing content elements) is the area covered by the perimeter minus the area taken up by the non-flowing content-elements.

Figure 10A:
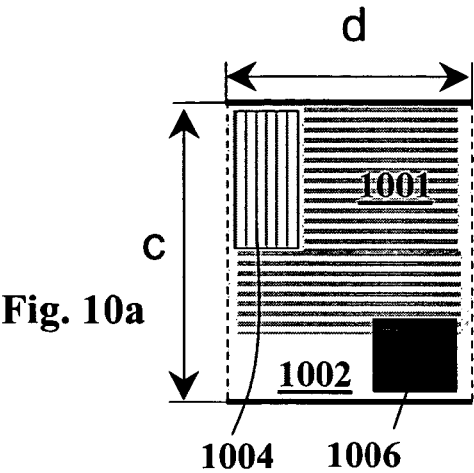
FIG. 10 shows an example of how an item processed by an embodiment of the invention may be re-sized.
Figure 10B:
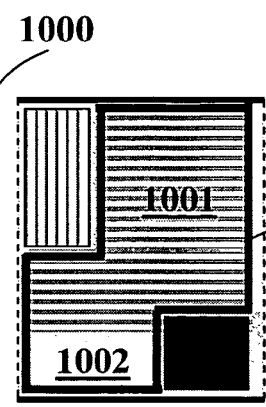
Figure 10C:
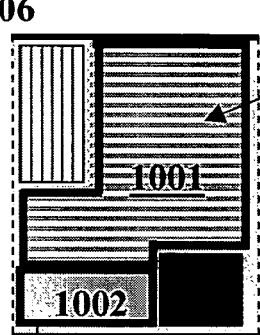
Figure 10D:
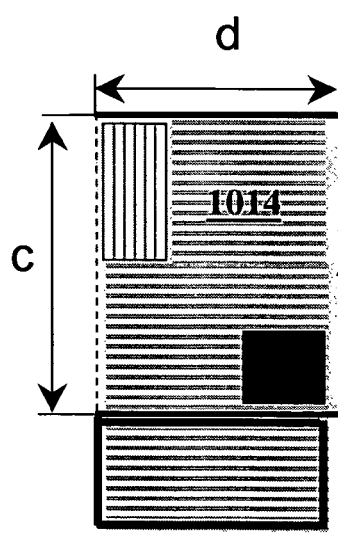
Figure 10E:
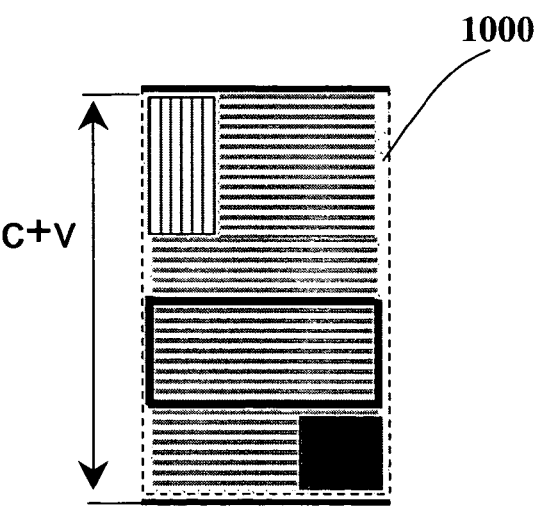

This is exemplified in FIGS. 10a, 10b, 10c. In FIG. 10, d is a dimension for the item that has been imposed by an external influence and c is a dimension of the item that can be altered. FIG. 10a shows an item 1000 having therein two non-flowing content-items 1004, 1006 together with a body of text 1001 which provides a flowing content-item. Thus, the first area ($A_{free}$) is shown by the boundary 1008 in FIG. 10b.

The second area (i.e. the area that would be covered by the flowing/dynamic content-elements) is determined. This can be seen in FIG. 10C wherein the area 1010 for the text (the flowing content-item) and the empty space 1012 is shown.

It will be appreciated that in a printed document the content-elements do not provide 100% page coverage—there is white space left. The amount of white (empty) space ($\epsilon$) may be determined by aesthetic considerations including the target audience of the document 180, etc. The amount of coverage of a document is governed by the aesthetic principle of density. It will be appreciated that the higher the cost of the document and/or goods/services to which it relates the lower the likely density of the content-elements in the document.

It will also be appreciated that the location of the white space may be a consideration. For example, a lot of free space within an item may mislead as to which content-elements lie within the item; content-elements within an item may be placed closer to one another than to content-elements of other items in order to emphasize the unity of elements in an item. In other embodiments unity may be further emphasized by using a background for an item which is different to the background of the document.

In considering the flowing content-elements there are 3 situations that may be considered which are described in relation to FIG. 10:

1. If $A_{flow}>A_{free}$ then the adjustable dimension of the perimeter should be increased in order that the flowing content-element can be contained therein. The perimeter should be increased by $v=(A_{flow}-A_{free})/d$ where d is the imposed dimension of the perimeter. This situation is exemplified in FIGS. 10d and 10e. It can be seen that in FIG. 10c there is too much text 1014 to fit within the item 1000 with a vertical dimension c. The above calculation is performed and the length c is increased by v such that the text 1014 can subsequently be incorporated into the item 1000.

Figure 10F:
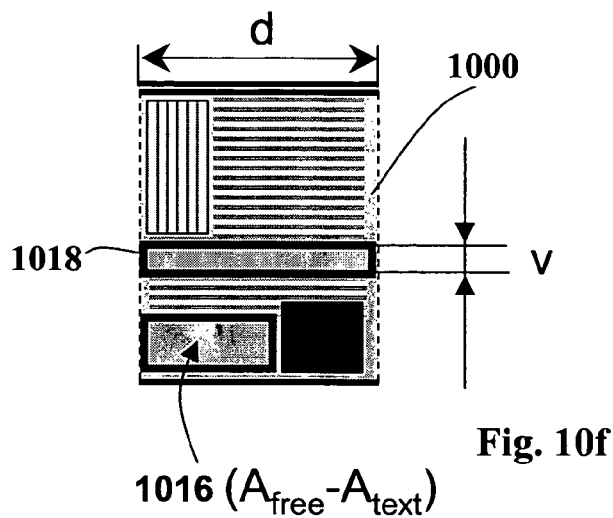
Figure 10G:
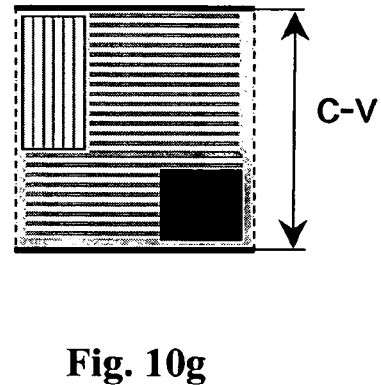

2. If $A_{free}-A_{flow}>\epsilon>0$ (i.e. there is too much white/empty space) then the dimension of the perimeter should be decreased by the min of $(A_{flow}-A_{free})/d$ and $(d-\lambda)$ where $\lambda$ is a maximal length of the overlap between the non-flowing content-elements and an arbitrary line parallel to the imposed dimension. Such a situation is exemplified in FIGS. 10f and 10g. Referring to FIG. 10c the dimension v is equal to $(A_{free}-A_{text})/d$. It will be appreciated from the foregoing that the empty area/white space within the item 1000 has an area equal to $A_{free}-A_{text}$. In FIG. 10f this is represented by the area 1016. However, it will be appreciated that the area 1016 does not extend for the whole width of the item 1000. An equal area extending across the whole width of the item is represented by the area 1018 which since is a rectangle has an area d×v. Since d and the area are known the amount by which the height c should be reduced is calculated and such an arrangement is shown in FIG. 10g.

3. If $A_{free}-A_{flow}<\epsilon$ or $A_{free}-A_{flow}>\epsilon$ together with $h=\lambda$ then place the flowing content-element since there is an acceptable match between the required and allocated space for the flowing content-element (which may for example be text).

Figure 10H:
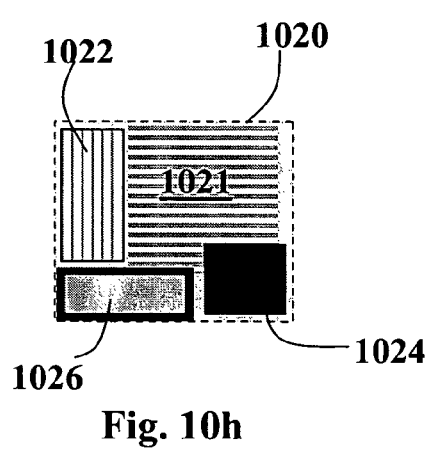
Figure 10I:
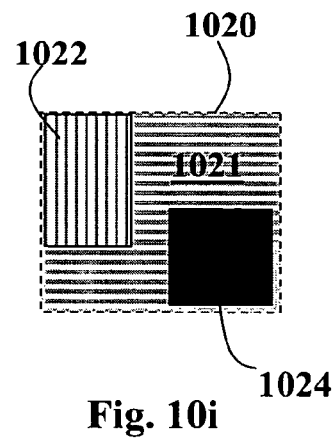

In some embodiments it may not be possible to alter a dimension of the perimeter and in such arrangements the relative sizes of content-elements within an item may be changed. Such an arrangement is shown in FIGS. 10h and 10i. FIG. 10h shows an item 1020 having a flowing content-item (an area of text) 1020 and two non-flowing content-item 1022, 1024 therein which in FIG. 10h leaves an area of space 1026. In this example it is not possible to alter the vertical or horizontal dimension of the perimeter 1020 and therefore the areas of the two non-flowing content-items 1022, 1024 are increased. Thus as shown in FIG. 10i the free space 1026 has been removed.

Summarising the method discussed above the main steps of filling an item may be considered as follows:

1. Place the non-flowing content-elements within the perimeter.
2. Apply all relevant conditional rules (whose conditions are true) which include:
   Resolving any overlaps between non-flowing elements by shifting covered objects in the extendable dimension;
   Removing any trapped areas that appear as a result of missing non-flowing content-elements
3. Compute a first area comprising the area covered by the non-flowing content-elements within the item.
4. Estimate a second area comprising the likely area that will be covered by flowing, or dynamic, content-elements.
5. Compare the first and second areas.
6. Calculate the free dimension of the perimeter of the item based upon the comparison made in step 5 such that the dynamic contents fit—generally within a given level of accuracy (desired level of density).

Thus, it will be appreciated from the foregoing that advantages of such embodiments are that content-elements are accommodated inside the perimeter without overlaps and white/empty space inside perimeter complies with requirements of aesthetical principle of density for the given document style. It will be appreciated from the foregoing that it is convenient to consider that flowing content-elements (such as text) have constant area.

A further example of this method is explained with reference to FIG. 6 and the flow chart of FIG. 8. For ease of reference, FIG. 6 has been divided into five columns, each referring to a different time. As shown in the first column of FIG. 6, an item that it is desired to lay out on a document 180 comprises three non-flowing content-element: a first picture content-element 700, a second picture content-element 702 and a third picture content-element 704. The item also comprises a dynamic (i.e. flowing content-element 706: a body of text relating to the first, second and third non-flowing content-elements 700, 702, 704.

Figure 6:
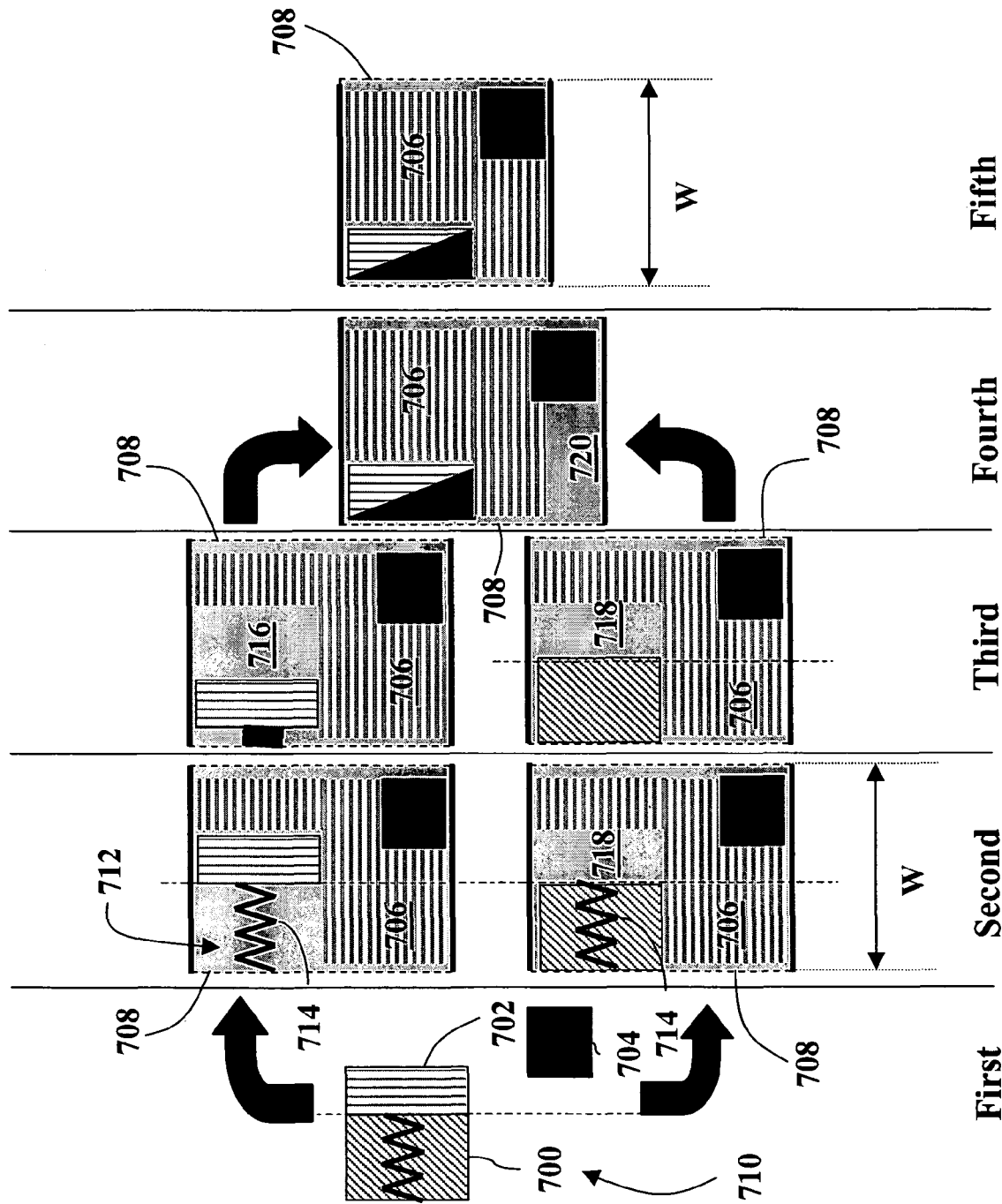
FIG. 6 further exemplifies the principles shown in FIG. 5.

It will be appreciated that whilst FIG. 6 shows only a single perimeter 708 in general there will be a plurality of such perimeters arranged on any one page of the document. Further, it will be appreciated that although the method is described as a series of discrete steps many of these steps may be performed concurrently with one another. Potential concatenations are highlighted below but others may be possible.

Figure 8:
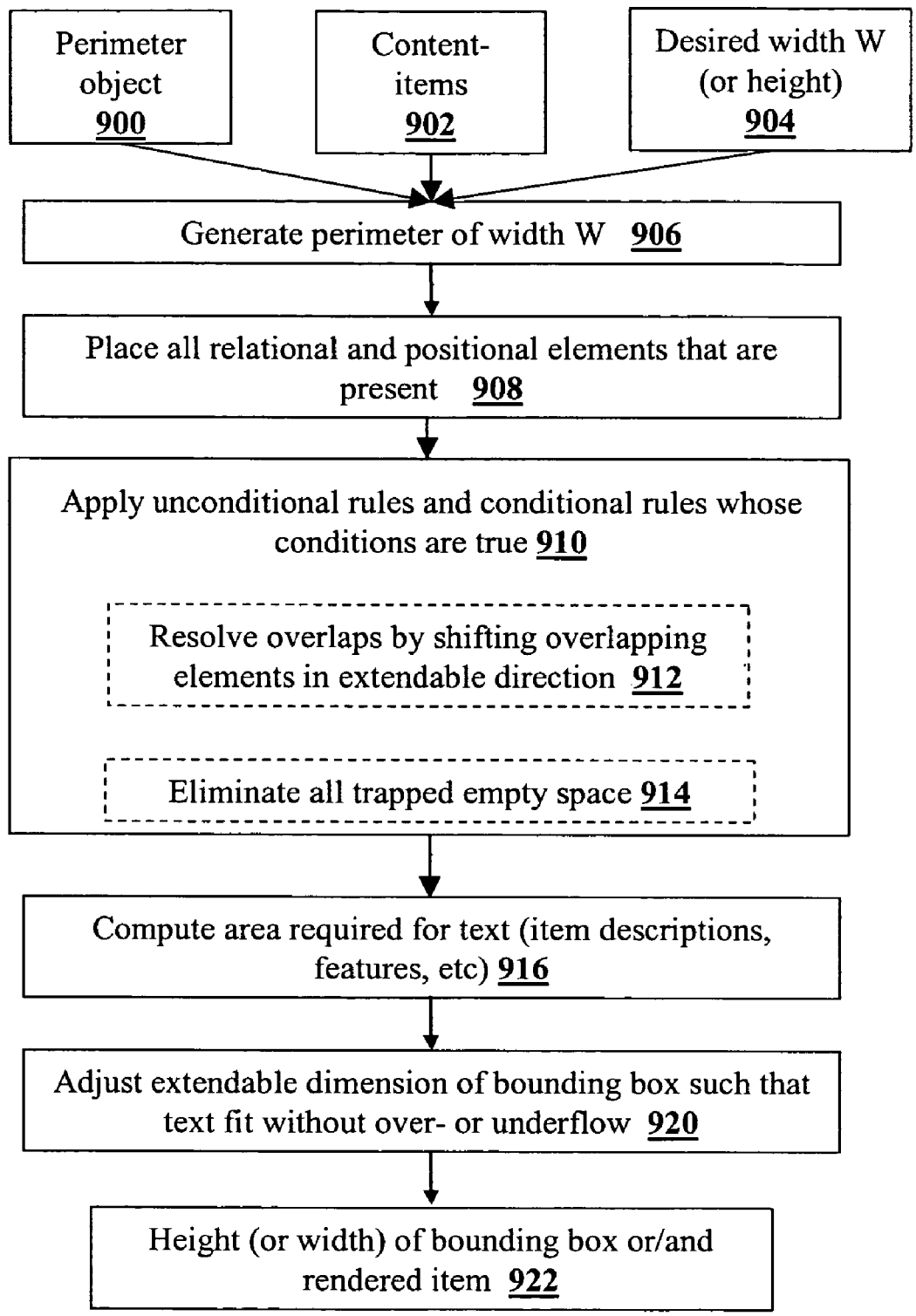
FIG. 8 shows a flow chart outlining one embodiment of the present invention.

As can be seen from FIG. 8, a perimeter object 900 having a one or more rules associated therewith (conditional and/or unconditional), the content-elements 902 for the perimeter to be laid out and the desired dimension (in this case width) 904 are all inputs to the method. Thus, a first step of the method is to obtain a plurality of content-elements from the content element store 152 within the memory 112, 114. The content-element store may be considered to be a supply of content elements. The perimeter object 900 is a construction used to hold the various parameters relating to the item that will be generated by the further steps of the method.

In some embodiments of the invention each perimeter object 900 has a number of fields associated therewith into which a non-flowing content-element may be received. As will be appreciated from the discussion in relation to FIG. 6 conditional rules may be provided to determine what should happen if such a non-flowing content-element is not available; either through an error or because it is not appropriate for that embodiment.

In step 906 of the method a perimeter is considered for the item that is being created. This step of the method is performed by the perimeter creation means 156. This perimeter 708 is represented by the dotted line around the items shown in the Figure. It will be noted that the leftmost version of the item 710, shown in the first column of the Figure, does not have a perimeter 708 shown since it shows some of the input content-elements 700, 702, 704. Further, it will be appreciated that the perimeter may be a construction (i.e. be a virtual perimeter) that is maintained within the memory 112, 114 which provides a model for performing the method and in such embodiments it may be convenient to think of the perimeter as being considered rather than generated.

Next in step 908 the non-flowing content-elements 700, 702, 704 that are present are positioned at the correct location within the item/perimeter 708. The arrangement means 158 is arranged to access the content-element store 154, obtain a plurality of content-elements and arrange these within the perimeter 708. It should be noted and will be discussed in relation to the remainder of FIG. 6 that some of the non-flowing content-elements are not present within this example. For example the desired content-element may have been deleted or corrupted in the content-element store 154 or the may not be required for that perimeter. For example, if the item to which the contents of a perimeter relates were a house that was for sale there may be fields for pictures of bedrooms 1, 2 and 3. However, for a 2 bedroom house the field for bedroom 3 would remain blank. In such circumstances rules associated with the perimeter would generally determine how the remaining pictures should be re-positioned.

It is conceivable that in some embodiments the non-flowing and dynamic content-elements are added to the perimeter at the same time, or indeed that the dynamic content-elements are added to the perimeter before the non-flowing content-elements.

Once the non-flowing content-items have been positioned within the perimeter 708 rules are applied to resolve any conflicts that may arise with the non-flowing items. For example, there may be overlaps, missing pictures, aesthetic principles are not followed and the like. It is possible that there are both non-conditional (i.e. those that are absolute) and conditional rules (i.e. those that depend on the outcome of another event).

As an example of a rule that may be applied any overlaps between any non-flowing content-elements are resolved in step 912. Thus any overlaps as described in relation to FIG. 5c are removed. There are no such overlaps in the example of FIG. 6 and thus this is not applicable to this example. Should any overlaps occur then the adjustment means 160 would perform the method described in relation to FIG. 5c. A force application means 162 may be used to facilitate the methods of FIG. 5c and apply the forces described in that Figure to the content-elements.

As a further example of a rule that may be applied at this stage, once overlaps have been removed then any trapped space is removed in step 914. This step is applicable to the example of FIG. 6 and will be expanded upon further. In the second column of the topmost flow of FIG. 6 the first non-flowing content-element 700 has been omitted. In the bottom-most flow of FIG. 6 the second non-flowing content-element 702 has been omitted.

Taking the topmost flow first, a gap 712 is left by the omission of the content-element 700 which should be removed in order that the item can be laid out in an aesthetically pleasing manner. As discussed in relation to FIG. 5b a conditional rule which applies a notional force is applied to the content-element 702, by the force application means 162, which tends to move the second content-element 702 to the left of the perimeter. This is represented/visualized by the spring 714. Thus it can be seen, in the third column of the Figure, that the content-element 702 moves toward the leftmost wall of the perimeter 708 leaving a gap 716 to its right.

Turning to the bottommost flow of the Figure, which shows the scenario in which the content-element 702 has been omitted leaving a gap 718 to the right of content-element 700, as seen in the second column of the Figure. It will be seen that the content-element 700 is already resting against the leftmost wall of the perimeter 708 and thus the conditional rule applying the spring force does not cause it to alter its position and thus the gap 718 is maintained.

Next, in step 916, the area of the item not covered by non-flowing content-elements is calculated (i.e. $A_{free}$) together with the area that would be covered by the flowing content-element 706 which in this case is text (i.e. $A_{flow}$). In step 920 the dimensions of the perimeter 708 are adjusted, by the adjustment means 160, in order that the flowing content-elements 706 fit within the perimeter 708 as described above in relation to FIG. 10. The flowing content-item may be likened to a liquid and will flow into the area left empty by the non-flowing content-element.

The fourth column of FIG. 6 highlights what would happen to the example in the third column if the flowing content-element 706 were simply re-flowed without re-sizing the perimeter 708: a gap 720 would appear below the flowing content-element. It will be appreciated that in this example, the width of the perimeter 708 has been imposed by an external influence at w and therefore, the vertical dimension of the perimeter 708 is reduced in step 920 in order that the flowing content-element 706 fits the available area as described by the mechanism described in relation to FIG. 10. The result is shown in the fifth column. It will be seen that the flowing content-element 706 fits the available space, there are no overlaps and there are no gaps. The third non-flowing content-element 704 has been moved in a vertical direction, toward the first 700 and second 702 non-flowing content-elements because the vertical dimension of the perimeter 708 was reduced. Thus, the content-elements have been re-arranged with in the perimeter as the dimensions of the perimeter have been adjusted. It will be appreciated that a possible concatenation of the method steps would be to adjust the perimeter and concurrently adjust the dynamic content-elements.

FIG. 7 shows a further example of the method in which an item 798 comprising a first non-flowing content-element 800 and a flowing content-element 802 is shown. Preferably the flowing content-element 802 should flows around the right and below the non-flowing content-element 800. FIG. 7a shows the item with a nominal width with as yet no imposition by an external influence; i.e. a dimension that is external to the perimeter. The item subsequently has a width imposed thereon by an external design rule at width y, this is shown in FIG. 7b.

In this example the width that is left for the flowing content-element 802 to the right of non-flowing content-element 800 is insufficient to accommodate the text of the specified font type and size (i.e. the flowing content-element 802). For example, this width is smaller than the width of the longest unbreakable word in the specified text, so given text cannot flow into the gap on the right of non-flowing content-element 800.

In this embodiment a conditional rule is applied to rectify this situation which is represented by the arrow 806. The rule states that if there is insufficient space for the text (i.e. the flowing content-element 802) then all of the text should be placed under the non-flowing content-element 800. However, in this embodiment simply moving the text below the non-flowing content-element 800 causes an aesthetical problem to arise: the layout as it is shown on FIG. 7c loses its right alignment line. One of the possible solutions for this problem is governed by a further conditional rule which results in the scaling up of the non-flowing content-element 800 to eliminate an undesired gap that would otherwise remain to the right of the non-flowing content-element 800. The resulting perimeter 808 is shown in FIG. 7e which has been extended in its vertical dimension in order to accommodate the resizing of the non-flowing content-element 800 (the width having been imposed by an external influence).

In other embodiments the conditional rule used to handle the area to the right of the non-flowing content-element 800 being too small to accommodate flowing content-element 802 scales down the non-flowing content-element 800 such that there is enough width for the text (flowing content-element 802).

The choice between these two conditional rules (whether to scale up or down the non-flowing content-element 800) is made by a user of the system. For example, non-flowing content-element 800 may be marked as capable of only being scaled up in size. A further embodiment, which is particularly advantageous if the non-flowing content-element 800 is non-rectangular, is for the non-flowing content-element 800 to be centralized without scaling.

In another embodiment the portion of the flowing content-element 802 that remains to the right of the non-flowing content-element 800 in FIG. 7*b* is deemed to be too narrow according to aesthetic criteria that are being applied in the rules of the embodiment used to generated FIG. 7.

In order to remove the narrow portion 804 of the flowing content-element 802 the non-flowing content-element 800 is scaled up in size as can be seen in FIG. 7*e*. This scaling causes the height of the item 798 to increase since the width has been imposed by an external influence. However, it can be seen that there are no gaps, overlaps or portions that may be deemed to break aesthetic rules with the version of the item 798 shown in FIG. 7*e*. Thus, it will be appreciated that non-flowing-content items may be scaled in order that the design principles used to create the document 180 are met.

The invention claimed is:

1. A method of creating a document from a page and a plurality of content items each having one or more content elements, the method comprising the steps of:
   for each content item, defining one or more perimeters;
   selecting, in respect of each content item, a perimeter;
   arranging the selected perimeters of each content item on the page;
   adjusting the dimensions of one or more of the selected perimeters so that all the content items lie within the boundaries of the page;
   automatically re-arranging content elements within an adjusted perimeter of a content item in accordance with pre-determined rules, in which the content-elements are treated by the method as being of one of two types: non-flowing content-elements which have constraints as to where they are positioned within a perimeter and flowing content-elements that do not have individual requirements as to where they are located within the perimeter, wherein the predetermined rules cause the elements and their positioning within the adjusted perimeter to be dynamically arranged, wherein an order in which flowing content-elements are arranged within the perimeter of the content item is adjustable by the predetermined rules; and
   printing a document displaying the content items.

2. The method of claim 1 in which one or more steps thereof is performed concurrently with one or more other steps of the method.

3. The method according to claim 1 in which the perimeters are rectangular and/or square.

4. The method according to claim 1 in which the perimeter is a virtual perimeter which is not visible in the document created by the method.

5. The method according to claim 1 in which the flowing content-elements have a variable shape.

6. The method according to claim 1 in which the method places the non-flowing content-elements within a perimeter before the flowing content items and before the perimeter is re-sized.

7. The method according to claim 6 in which the area of the perimeter not taken up by non-flowing content-elements is compared with the area that is required for flowing content-elements and the comparison is used to determine the adjusted dimensions of the perimeter.

8. The method according to claim 1 in which the flowing content-elements are placed within the perimeter as or after the perimeter has been re-sized.

9. The method according to claim 8 in which the flowing content-elements are placed within the perimeter after content-elements within the perimeter have been re-arranged.

10. The method according to claim 1 in which the pre-determined rules govern how content-elements move within a perimeter.

11. The method according to claim 10 in which at least one of the dimensions of the perimeter is fixed such that when the dimensions of the perimeter are adjusted the fixed dimension is not adjusted.

12. The method according to claim 11 in which the fixed dimension is imposed by a dimension external to the perimeter.

13. The method according to claim 1 in which the automatically re-arranging step occurs in response to an element being unavailable for inclusion in an arrangement of elements within the adjusted perimeter.

14. The method according to claim 1 in which the pre-determined rules govern how flowing content elements move within a perimeter to occupy space not being utilized by the unavailable element.

15. A document creation system comprising:
   a supply of content-elements that it is desired to place on a document;
   a perimeter creation portion arranged to consider one or more perimeters each suitable for containing a plurality of content-elements;
   an arrangement portion arranged to access the supply of content-elements, obtain a plurality of such content-elements for each of the perimeters created by the perimeter creation portion and arrange them within the perimeter; and
   an adjustment portion arranged to adjust the dimensions of at least one perimeter in order to create the document and to automatically re-arrange the content-elements and their positioning within the adjusted perimeter according to pre-determined rules, in which the supply of content-elements is arranged to hold two types of content-elements: non-flowing content-elements which have constraints as to where they are positioned within a perimeter and flowing content-elements that do not have individual requirements as to where they are located within the perimeter, wherein the predetermined rules cause the content-elements within the adjusted perimeter to be dynamically arranged within the perimeter of the content item, wherein an order in which flowing content-elements are arranged is adjustable by the pre-determined rules.

16. The system according to claim 15 in which the adjustment portion is arranged to place non-flowing content-elements within a perimeter before the flowing content-elements.

17. The system according to claim 16 in which the flowing content-elements are placed into a perimeter as or after the perimeter is adjusted.

18. The system according to claim 15 in which the content-elements are automatically rearranged in response to a content-element being unavailable for inclusion in an arrangement of content-elements within the adjusted perimeter.

19. The system according to claim 15 in which the pre-determined rules govern how flowing content elements move within a perimeter to occupy space not being utilized by the unavailable element.

20. A non-transitory computer-readable medium containing a program including instructions executed by a processor to perform a method of creating a document, the method comprising:
   a. obtaining a plurality of content-elements that is desired to print on the document;

b. evaluating one or more perimeters into which the obtained content-elements are to be placed;
c. evaluating arrangements of the perimeters on the document;
d. adjust adjusting the dimensions of one or more perimeters such that the perimeters can be placed on the document;
e. automatically arranging the content-elements within a perimeter according to pre-determined rules as the dimensions are adjusted, in which the content-elements are of two types of content-elements: non-flowing content-elements which have constraints as to where they are positioned within a perimeter and flowing content-elements that do not have individual requirements as to where they are located within the perimeter, Wherein the predetermined rules cause dynamic arrangement of content-elements and their positioning within the adjusted perimeter, wherein an order in which flowing content-elements are arranged within the perimeter of the content item is adjustable by the predetermined rules; and
f. generating the document created by the method.

* * * * *

UNITED STATES PATENT AND TRADEMARK OFFICE
CERTIFICATE OF CORRECTION

PATENT NO. : 8,074,169 B2  Page 1 of 1
APPLICATION NO. : 11/190249
DATED : December 6, 2011
INVENTOR(S) : Helen Balinsky It is certified that error appears in the above-identified patent and that said Letters Patent is hereby corrected as shown below:

In column 15, line 43, in Claim 2, delete "method of" and insert -- method according to --, therefor.

In column 16, line 66, in Claim 20, delete "that is" and insert -- that it is --, therefor.

In column 17, line 5, in Claim 20, delete "adjust adjusting" and insert -- adjusting --, therefor.

In column 17, line 8, in Claim 20, delete "arranging" and insert -- re-arranging --, therefor.

In column 17, line 11, in Claim 20, delete "types of content-elements:" and insert -- types: --, therefor.

In column 18, line 3, in Claim 20, delete "Wherein" and insert -- wherein --, therefor.

Signed and Sealed this
Eleventh Day of September, 2012

David J. Kappos
*Director of the United States Patent and Trademark Office*